US005876501A

United States Patent [19]
Doan

[11] Patent Number: 5,876,501
[45] Date of Patent: Mar. 2, 1999

[54] WHEEL SOAPING APPARATUS

[75] Inventor: Paul George Doan, Warren, Mich.

[73] Assignee: Fori Automation, Inc., Shelby Township, Mich.

[21] Appl. No.: 862,784

[22] Filed: May 23, 1997

[51] Int. Cl.$^6$ ............................................ B05C 1/00
[52] U.S. Cl. ........................ 118/679; 118/244; 118/258; 118/264; 118/500; 157/1.1; 184/3.1; 184/3.2; 184/102
[58] Field of Search .................... 118/679, 244, 118/258, 264, 323, 500; 134/123; 15/88.4, 88, 21.1; 157/1.1; 184/3.1, 3.2, 102

[56] References Cited

U.S. PATENT DOCUMENTS

| | | | |
|---|---|---|---|
| 2,150,462 | 3/1939 | Schultz et al. | 118/72 |
| 2,661,053 | 12/1953 | Mullen | 157/1.1 |
| 2,665,747 | 1/1954 | Harrison | 157/1.1 |
| 2,805,699 | 9/1957 | Reading | 157/13 |
| 2,975,447 | 3/1961 | Vuchinas | 15/53.4 |
| 3,044,088 | 7/1962 | Anderson | 15/21.1 |
| 3,089,576 | 5/1963 | Sauer et al. | 198/634 |
| 3,219,078 | 11/1965 | Wright | 157/18 |
| 3,461,938 | 8/1969 | Mueller | 157/1.1 |
| 3,545,463 | 12/1970 | Mueller | 157/1.24 |
| 3,658,152 | 4/1972 | Mueller | 184/109 |
| 3,700,021 | 10/1972 | Motis | 157/1.1 |
| 3,741,271 | 6/1973 | Ross et al. | 157/1.1 |
| 3,785,424 | 1/1974 | Rishovd | 157/1.1 |
| 3,786,852 | 1/1974 | Houston | 157/1.1 |
| 3,883,744 | 5/1975 | Steffel | 378/61 |
| 3,895,716 | 7/1975 | Ugo | 209/564 |
| 3,906,894 | 9/1975 | Pesapane | 118/315 |
| 3,978,903 | 9/1976 | Mueller et al. | 157/1.2 |
| 4,004,693 | 1/1977 | Tsuji et al. | 410/119 |
| 4,116,055 | 9/1978 | Kogler et al. | 73/146 |
| 4,183,392 | 1/1980 | Kane | 157/1.1 |
| 4,308,631 | 1/1982 | Hanna | 15/53.4 |
| 4,311,044 | 1/1982 | Marshall et al. | 73/146 |
| 4,414,843 | 11/1983 | Kounkel et al. | 73/66 |
| 4,430,958 | 2/1984 | Boggs | 118/668 |
| 4,434,652 | 3/1984 | Christie | 73/146 |
| 4,488,430 | 12/1984 | Fujimoto et al. | 73/146 |
| 4,563,975 | 1/1986 | Kozlowski et al. | 118/320 |
| 4,621,671 | 11/1986 | Kane et al. | 157/1.1 |
| 4,669,417 | 6/1987 | Pederson et al. | 118/44 |
| 4,723,563 | 2/1988 | Kane | 134/144 |
| 4,878,262 | 11/1989 | Stufflebeam et al. | 15/53.4 |
| 5,052,218 | 10/1991 | Iwama | 73/146 |
| 5,170,828 | 12/1992 | Curcui | 157/1 |

*Primary Examiner*—Laura Edwards
*Attorney, Agent, or Firm*—Reising, Ethington, Learman & McCulloch, PLLC

[57] ABSTRACT

Wheel lubricating apparatus includes a conveyor for transporting wheels on their side in succession into position to be lifted by a lower unit into clamp engagement with an upper stationary unit to support the wheel to be lubricated against rotation. A pair of lubricant brushes are supported by a rotary carriage on opposite sides of the wheel and are rotated in alternating half rotations during each successive soaping cycle to apply soap to the bead seats of the wheels.

17 Claims, 8 Drawing Sheets

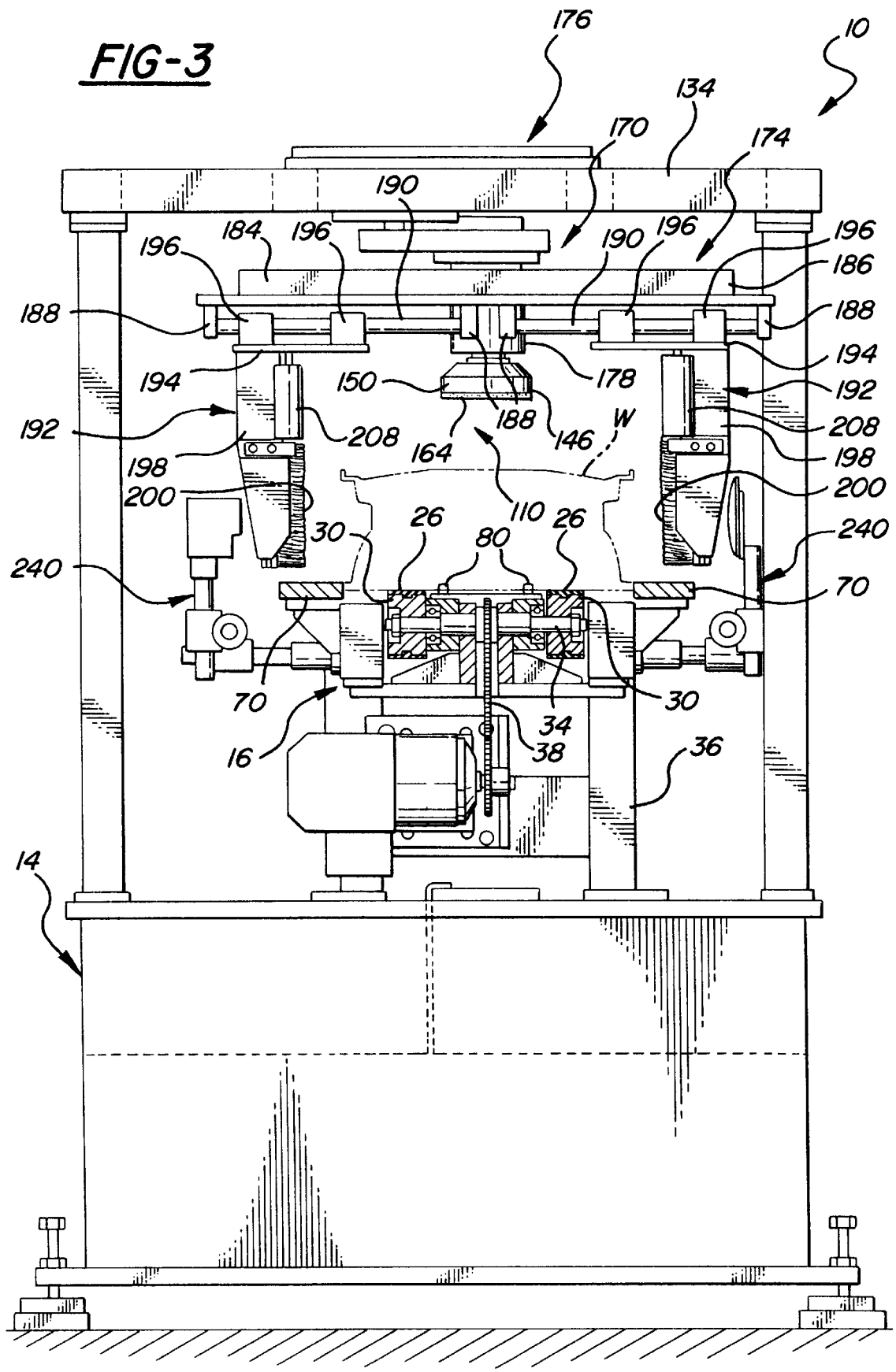

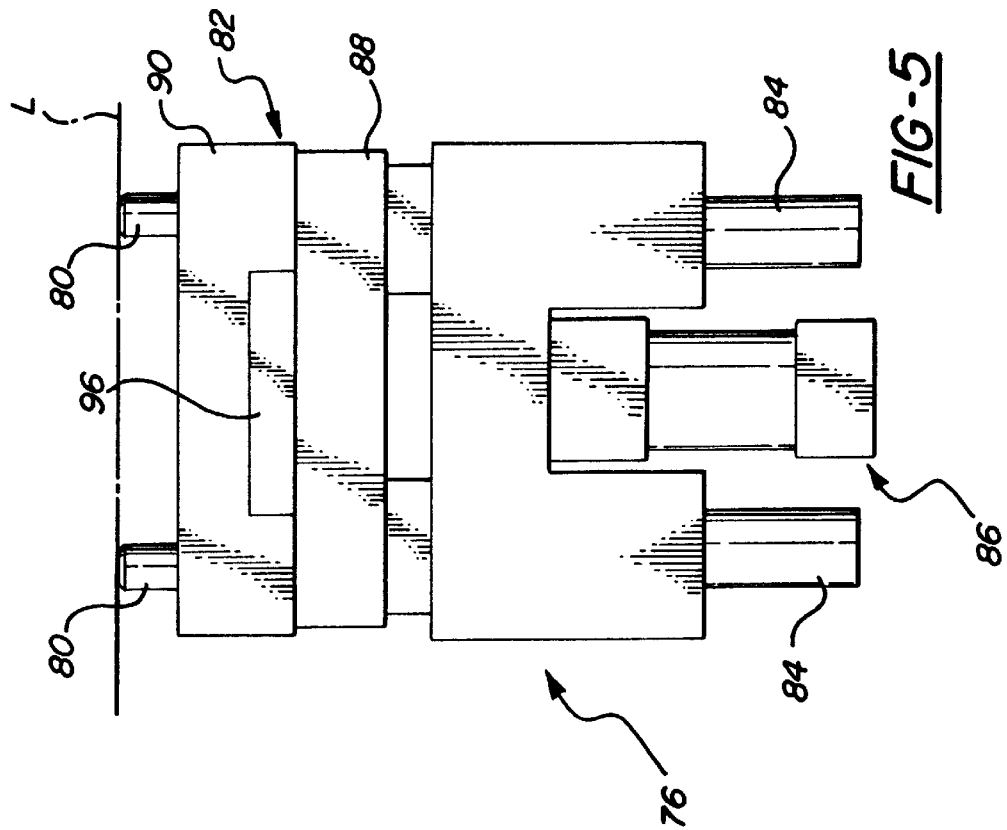
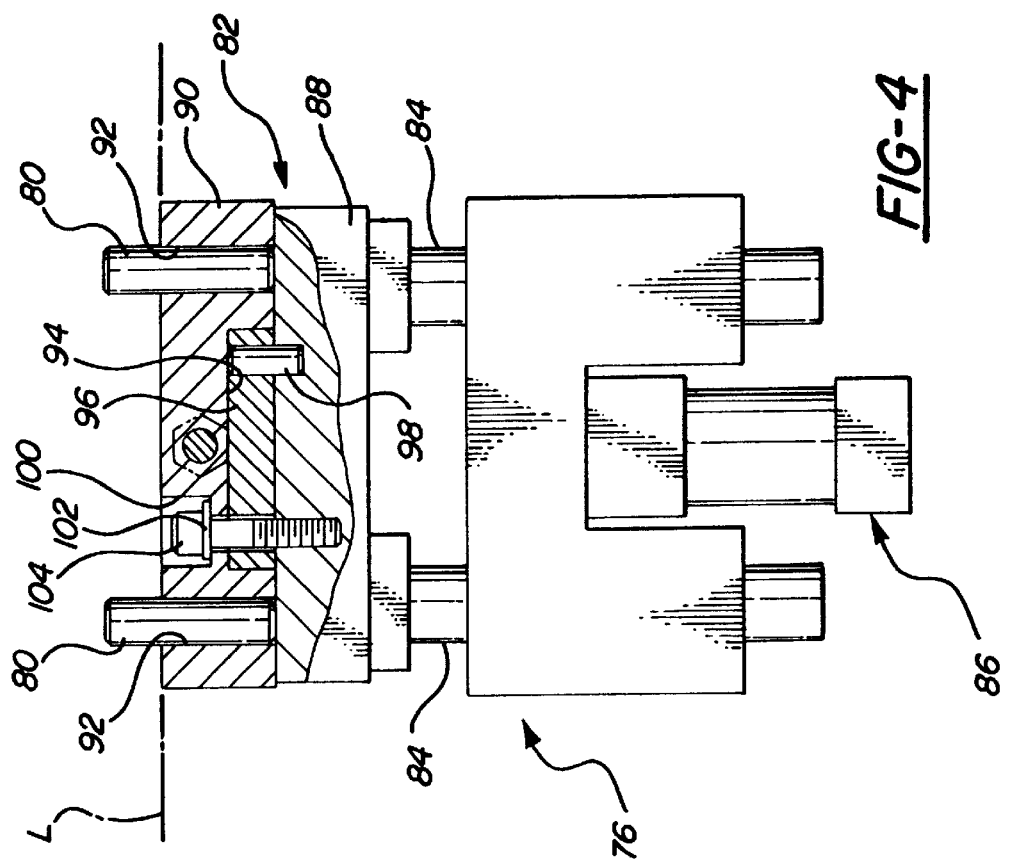

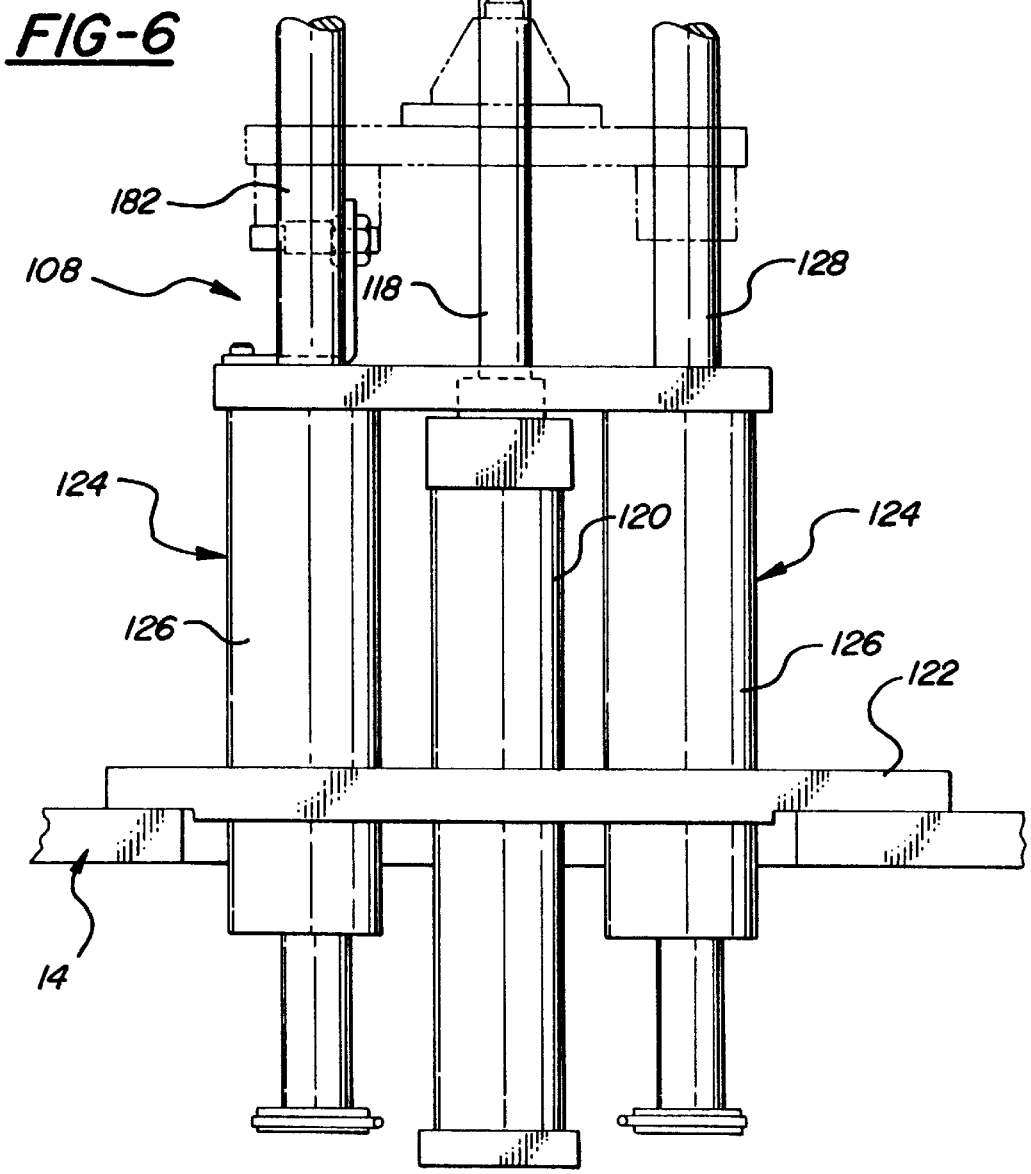

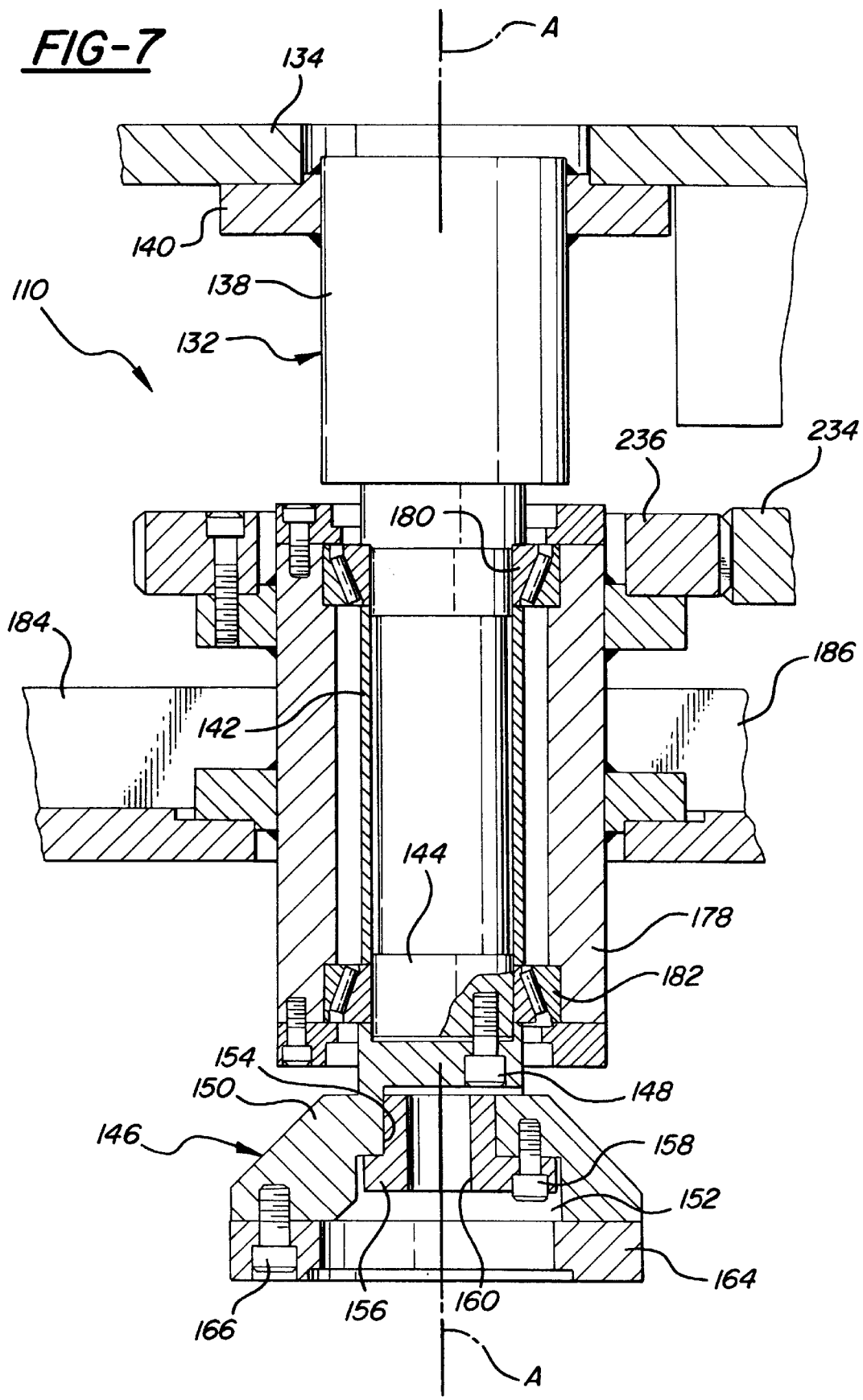

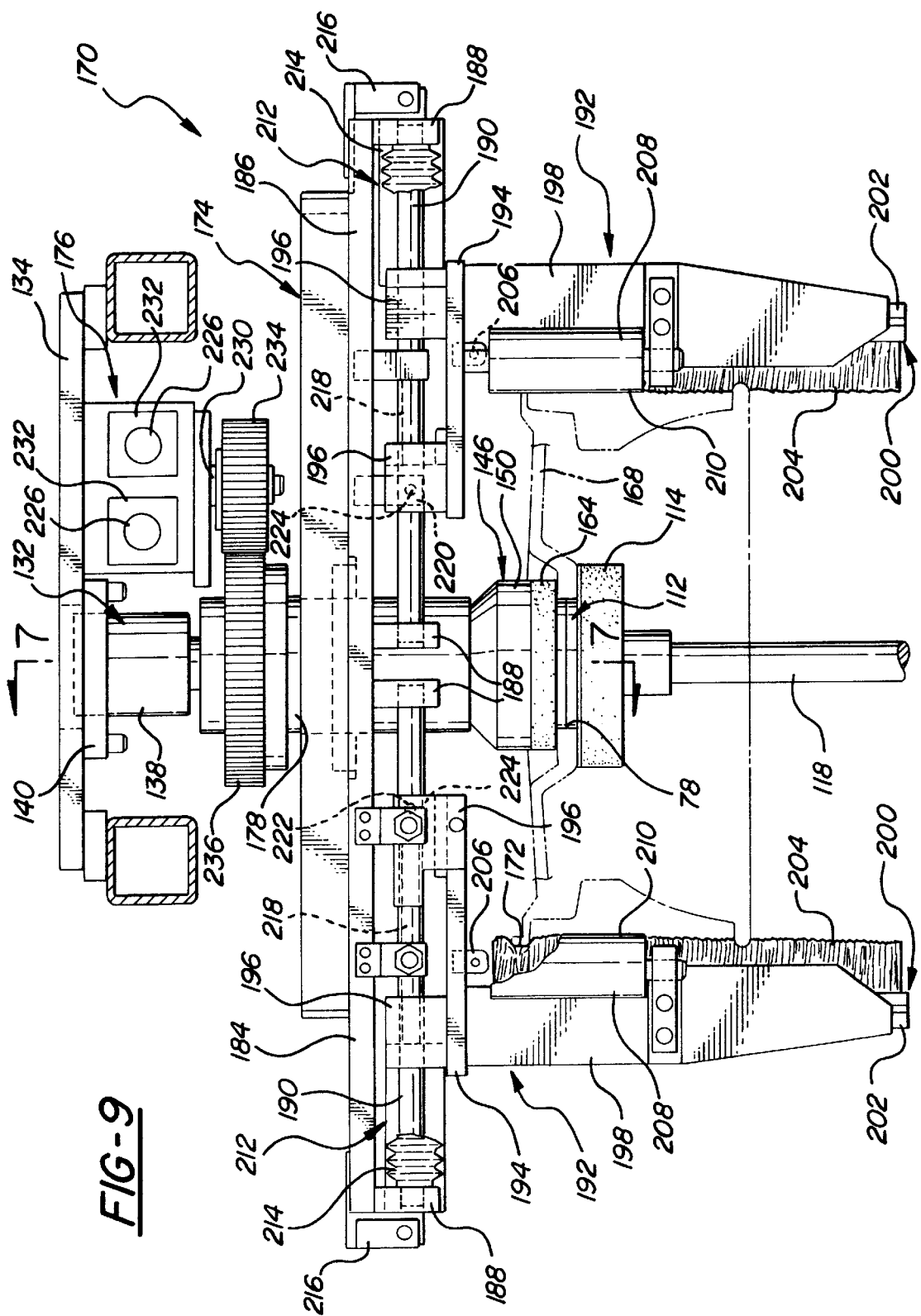

WHEEL SOAPING APPARATUS

This invention relates to an apparatus and method for applying lubricant to the rims of a wheel to facilitate the mounting of a tire upon the wheel.

BACKGROUND OF THE INVENTION

It is common practice when mounting a tire on a wheel to apply a lubricant such as a liquid soap solution to the wheel rims. The lubricant permits the beads of the tire to be forced over the wheel rim without damage and assists in forming an air-tight seal between the rims and beads once mounted.

Under high production conditions, such as in the automotive industry, automated equipment is used to perform the lubricating and mounting operations. It is of course desirable that these operations be carried out as quickly as possible to maximize productivity while achieving satisfactory results.

Present high production wheel lubricators spray or brush the lubricant onto the wheel rims while the wheel is spun about its axis of rotation. U.S. Pat. No. 4,723,563 discloses one such apparatus in which the wheel is engaged by a cone and lifted against a rotating drive disk, causing the wheel to spin on its axis while lubricant is sprayed onto the wheel from an adjacent stationary nozzle. A disadvantage of applying the lubricant in this manner is that it is difficult to control the amount and distribution of the lubricant applied. Soap is applied to not only the bead seats where it is needed, but also to the entire circumferential area of the wheel between the bead seats. The application of excess lubricant is wasteful and causes difficulties later on in the assembly process as some of the soap is carried with the wheel and drips off onto other equipment. The excess lubricant also can disrupt proper balancing of the wheel and tire, since the lubricant may be taken into account during balancing and then redistribute or dry, throwing off the balance. Another disadvantage with this approach is that the wheel is caused to rotate several revolutions during soaping, which takes valuable time and requires stoppage of the wheel before transfer to the next station.

Another wheel lubricator applies soap to the beads of wheels in similar manner but using one or two stationary applicator brushes rather than a spray nozzle. Although use of stationary applicator brushes instead of a nozzle lessens the oversoaping problem, it still requires that the wheel be rotated and thus shares the difficulties of the spray nozzle type wheel soaper in this respect.

Wheel lubricating apparatus and method according to the present invention overcomes or greatly minimizes all of the foregoing objections.

SUMMARY OF THE INVENTION

Wheel lubricating apparatus constructed in accordance with the invention comprises a frame on which a wheel support assembly is mounted for supporting the wheel to be lubricated against rotation about its axis of rotation. An applicator assembly is supported for rotation about the axis relative to the wheel for applying lubricant to the rims.

Supporting the wheel stationary and rotating the applicator assembly about the wheel enables better control of the amount and distribution of the lubricant applied to the wheel rims and greatly reduces the cycle time (by as much as 1 second or 10% over prior processes that rotate the wheel). According to a further particular feature, the applicator assembly includes diametrically opposed brushes which are moveable into engagement with the wheel rim, rotatable through at least a half revolution around the stationary wheel to apply the lubricant to the wheel, and then retractable out of engagement with the wheel to allow it to be transferred on to the next station.

THE DRAWINGS

A presently preferred embodiment of the invention is disclosed in the following detailed description and in the accompanying drawings, wherein:

FIG. 3 is an elevational end view shown partly in section;

FIG. 4 is an enlarged elevational end view shown partly in section of the wheel locating device in the elevated wheel-stopping position;

FIG. 5 is a view similar to FIG. 4 but with the device lowered to the retracted position;

FIG. 6 is an enlarged fragmentary elevational front view, shown partly in section, of the wheel lifting and support mechanism;

FIG. 7 is an enlarged fragmentary elevational front section view showing details of the support arrangement for the rotary applicator assembly;

FIG. 9 is an enlarged elevational end view of the rotary applicator and wheel support assemblies.

DETAILED DESCRIPTION

Figure 1:
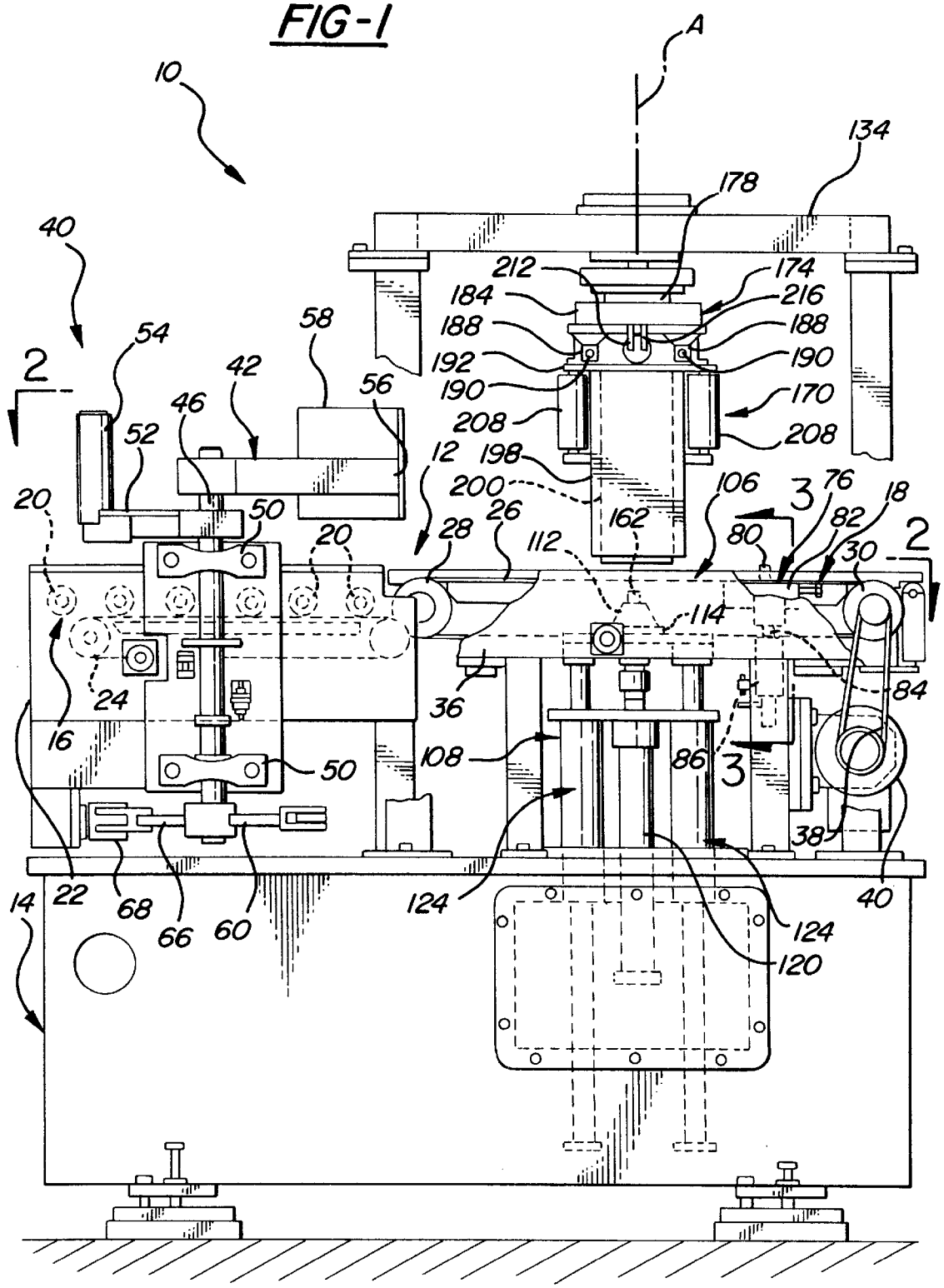
FIG. 1 is a fragmentary elevational front view of a wheel soaping apparatus according to the invention.

Turning now in more detail to the drawings, a wheel lubricating apparatus constructed according to a presently preferred embodiment of the invention is designated generally at 10 and is adapted for use in an automated tire/wheel assembly line in which pneumatic tires are mounted, inflated and then balanced on corresponding wheels. The apparatus 10 is but one station of the assembly line and is dedicated to the operation of applying lubricant to the rims of the wheels to prepare the wheels for mounting, at a subsequent station, an associated tire thereon.

The apparatus 10 includes a wheel conveyor generally designated 12 mounted on a fixed base designated generally 14. The conveyor 12 includes an incoming power roller section 16 and a main conveying section 18 down line of the incoming section 16. The incoming section 16 comprises a conventional power roll conveyor having a plurality of rollers 20 journaled at their ends by a support frame 22 and driven from beneath in the same direction by a continuous drive belt device 24 in contact with the rollers 20 for advancing incoming wheels W on their sides to the main conveying section 18.

The main conveying section 18 comprises a pair of endless toothed conveyor belts 26 trained about end sprocket supports 28, 30, which in turn are journaled by shafts 32, 34, respectively, to a support frame 36 for rotation about horizontal axis of the shafts 32, 34. Shaft 34 is coupled by an endless drive belt or chain 38 to a motor 40 to drive the shafts 32 and hence the belts 26 in the downline direction for conveying the wheels W from the incoming section 16 along the apparatus 10 for treatment, to be explained in greater detail below.

The incoming section 16 includes a wheel metering device 40 for controlling the delivery of the wheels W from the incoming section 16 to the main conveying section 18. The metering device 40 includes a pair of swing arms 42, 44 supported above the level of the rollers 20 on opposite lateral sides thereof at the upper ends of associated vertical shafts 46, 48 coupled by journal blocks 50 to the support frame 22. The arms 40, 42 are generally L-shaped and include first legs 52 that extend from the shafts 46, 48 in the upline direction of wheel delivery along the conveyor 12 and carry vertical rollers 54 at their free ends.

Second legs 56 of the swing arms 42, 44 extend from the shafts 46, 48 in the downline direction of wheel conveyance and carry vertically disposed paddles 58 at their free ends. The rollers 54 and paddles 58 contact the wheels W as they are conveyed along the rollers 20, and as such are fabricated preferably of a tough, non-marring material such as nylon so as not to damage either the wheels W or the metering device 40. Radius arms 60, 62 are fixed to the lower ends of the shafts 46, 48, respectively, and extend in opposite up and down line directions. The radius arms 60, 62 are coupled at their free ends by an adjustable length rigid tie rod 64. A torsion arm 66 is also fixed to the lower end of the shaft 46 and extends radially outwardly therefrom to a free end which is coupled to a linear actuator device 68 to rotate the torsion arm 66 and hence the shafts 46, 48 and swing arms 42, 44 in equal but opposite directions to position the arms 42, 44 between a wheel blocking position illustrated by broken chain lines in FIG. 2 in which the second legs 56 are swung into the path of the wheels W to block a wheel received between the arms 42, 44 from conveyance onward to the main conveying section 18, and a wheel-releasing position illustrated in solid lines in FIG. 2 wherein the second legs 56 are swung outward to release the wheel and the first legs 52 are swung inward into the path ahead of the next successive wheel to temporarily block its conveyance into position between the arms 42, 44 until such time as the arms are swung back to the wheel blocking position.

Adjustable guide rails 70 are mounted on the support frame 36 on opposite longitudinal sides of the conveyor belts 26 of the main conveyer section 18 for guiding the wheels W longitudinally along the main conveyor 18. The rails 70 have elongate adjustment slots 72 in which retaining bolts 74 are installed and threaded into the underlying support frame 36. Loosening the bolts 74 enables the rail 70 to be adjusted laterally inwardly or outwardly relative to the belts 26 in order to adjust the width of the guide path along the main conveyor 18 for accommodated wheels of different diameters.

Figure 2:
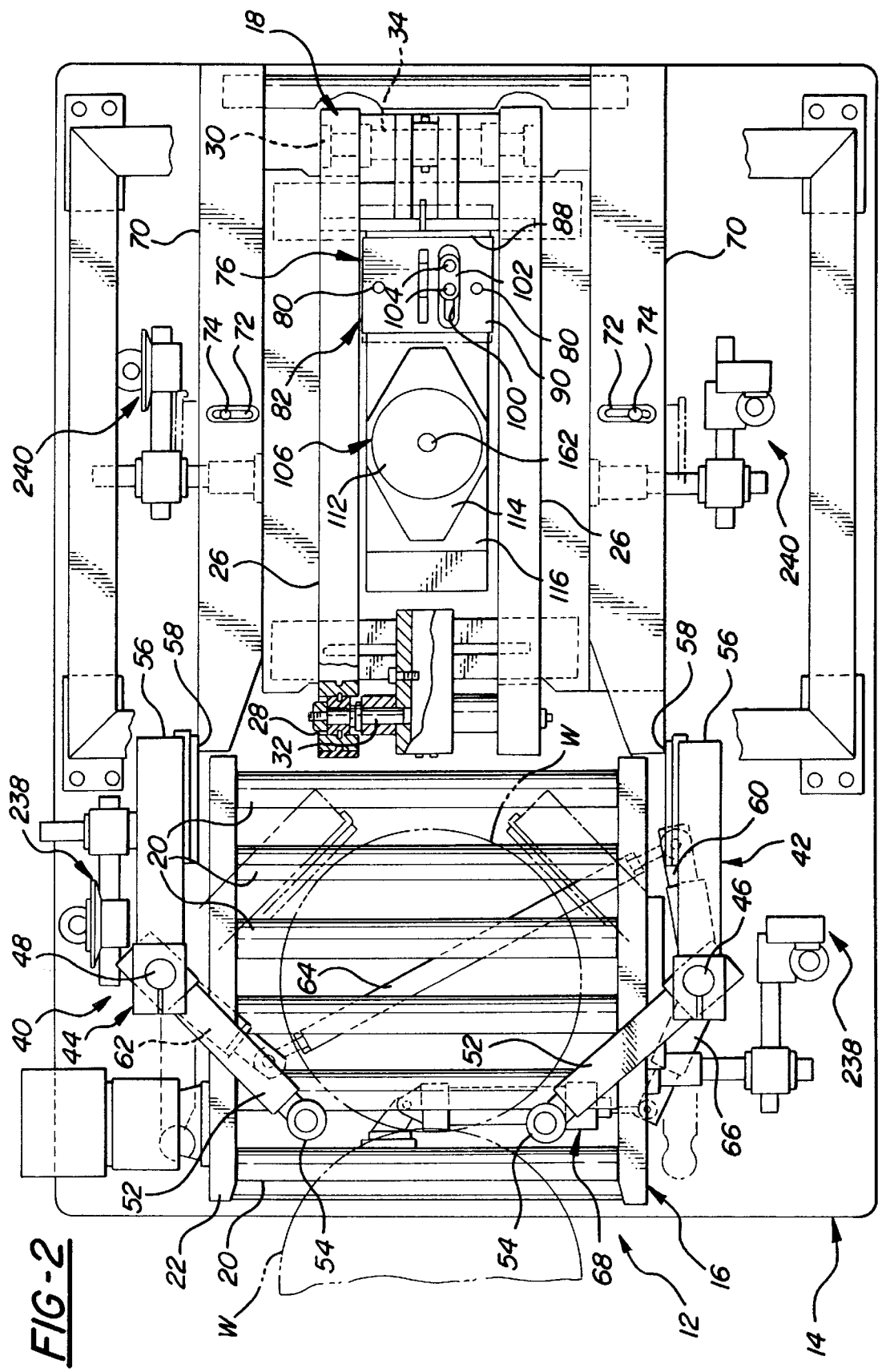
FIG. 2 is a fragmentary plan view taken along lines 2—2 of FIG. 1.

A wheel locating device 76 is provided for selectively stopping and locating the wheels W in a predetermined position along the conveyor 18 in which a primary vertical working axis A of the apparatus 10 extends through the central hub opening 78 of the wheel W. The locating device 76, as shown best in FIG. 2, is located in the space between the conveyor belts 26 adjacent the exit end of the conveyor 18 and comprises, as best shown in FIG. 4 and 5, a pair of stop pins 80 mounted in a support block 82 which in turn is fixed to vertically reciprocal shafts 84 of an air cylinder actuator 86 mounted on the support frame 36 of the conveyor 18. The reciprocating air powered actuator 86 selectively positions the stop pins 80 vertically between a fully retracted position illustrated in FIG. 5 in which the pins 80 are below the level L of the path of wheels W moving across the main conveyor 18, and a vertically raised position illustrated in FIG. 4 in which the pins 80 project above the level L into the path of the wheels W as they move across the conveyor 18.

The support block 82 is designed to permit adjustment in the longitudinal positioning of the stop pins 80 relative to the primary vertical work axis A of the apparatus 10. As shown best in FIG. 4, the block 82 includes a lower stationary plate 88 fixed to the upper ends of the shaft 84. An upper slide plate 90 is supported on the lower plate 88 and includes bores 92 in which the pins 80 are received. A longitudinally extending guide way or channel 94 is provided in the underside of the plate 90 and accommodates an intermediate guide plate 96 which is fixed against longitudinal movement to the lower plate 88 by dowel pin 98. The slide plate 90 is formed with a longitudinal adjustment slot 100 that is countersunk to accommodate an oblong washer 102 and the heads of a pair of adjustment bolts 104 the shanks of which extend through corresponding openings in the washer 102 and guide plate 96 and are threaded into the lower stationary plate 88. Loosening the bolts 102 enables the top plate 90 to slide longitudinally on the bottom plate 88 so as to position the stop pins 80 closer to or further from the primary work axis A in order to accommodate and properly locate the central hub openings 78 of wheels of different diameters in line with the work axis A.

A wheel support assembly 106 is provided along the main conveyor section 18 upline of the wheel locating device 76 and is operative to engage a wheel stopped by pins 80, lift the wheel off the conveyor 18, and support the wheel against rotation during which lubricant is applied to the rims of the wheel in a manner to be described. As shown best in FIGS. 6 and 7, the wheel support assembly 106 includes a lower vertically reciprocal unit 108 and a fixed upper unit 110. The lower unit 108 includes a cone 112 and pressing plate 114 mounted against rotation to an upper platen 116 which in turn is fixed to an upper free end of a vertically reciprocal shaft 118 of an air cylinder actuator 120 mounted on the base 14 by cross plate 122. Telescoping guides 124 are provided on opposite lateral sides of the actuator 120 and include guide sleeves 126 fixed to the base 14 by cross plate 122 slidably supporting guide rods 128 secured at their upper ends to the platen 116. The cone 112 is aligned axially along the vertical working axis A of the apparatus 10 and is tapered along its length to its widest diameter at its base 130 selected to closely approximate the diameter of the central hub opening 78 of the wheels W.

The upper unit 110 includes a vertical spindle 132 secured at its upper end to an overhead support frame 134 and mounting at its lower end a clamping member 146. The spindle 132 includes a solid upper portion 138 welded or otherwise fixed to the frame 134 by mounting flange 140, and intermediate tubular portion 142 fixed at its upper end to a reduced diameter end portion 138 and mounting at its lower end a solid insert 144 to which a stationary upper clamping member 146 is releasably fixed against movement by releasable fasteners 148 threaded into the insert 144. The clamping member 146 includes a main metal body portion 150 attached at its upper end by fasteners 148 to portion 142 and having a downwardly opening cavity 152 in its lower end to accommodate a portion of the cone 112 therein, as illustrated in FIGS. 6 and 9.

As also shown in FIGS. 6 and 7, the cavity 152 includes an axial upper recess 154 in which a cylindrical sleeve bushing 156 is installed and secured removably in place by fastener 158. The bushing 156 is fabricated of a low-friction, wear-resistant material such as nylon and provides a cylindrical bore 160 aligned coaxially with the primary working axis A of the apparatus 10. The bore 160 is designed to accommodate the upper end of an alignment pin 162 of the lower unit 108 projecting axially beyond the top of the cone 112, so as to insure that the lower unit 108 is aligned coaxially with the upper unit 110 along the primary work axis A when the pin 162 is received in the bore 160.

The clamping member 146 also includes a pressing ring 164 fabricated preferably of the same tough non-marring material as the pressing plate 114 of the lower unit 108 and mounted removably to the lower face of the body 150 by fasteners 166 in surrounding relation to the bore 160. As shown best in FIGS. 6 and 9, the pressing plate 114 and ring 164 cooperate to engage and clamp the central disk 168 of the wheel W on opposite sides thereof in the vicinity surrounding the central hub opening 78 of the wheel so as to support the wheel W above the level L of the conveyor 18 along the primary work axis A and against rotation about the axis A.

The apparatus 10 includes a rotary applicator assembly 170 that operates in cooperation with the wheels support assembly 106 to apply lubricant in the preferred form of liquid soap to the bead seats or rims 172 of the wheels W. The applicator assembly 170 includes a rotary carriage 174 mounting a pair of lubricant applicators in the preferred form of brushes 200 for selective driven rotation about the primary work axis A by rotary actuator 176. The carriage 174 includes a cylindrical hub 178 journaled on the spindle 132 by upper and lower bearings 180, 182, respectively. Arms 184, 186 extend radially outwardly from the hub 178 in diametrically opposed relation to one another and have support blocks 188 adjacent the axis A and the outer free ends of the arms 184, 186 in which laterally spaced pairs of guide rails 190 are supported at their ends in generally coextending relation to the arms 184, 186. Each set of guide rails 190 supports a brush carriage 192 moveable along the guide rails 190 radially of the work axis A. Each carriage 192 includes an upper support plate 194 having guide sleeves 196 mounted about the rails 190 to provide slidable support to the carriage 192 along the length of the rails 190. Rigid support legs 198 project vertically downwardly from the upper plate 194 and mount replaceable applicator brushes 200, each brush having a rigid base 202 bolted or otherwise attached releasably to the legs 198, and a pile of bristles 204 projecting from the base 202 inwardly toward the vertical axis A. The preferred brushes have high density bristles fabricated of nylon having a filament diameter on the order of about 0.01 inches.

Lubricant dispensing nozzles 206 are mounted on the legs 198 adjacent the brushes 200 and communicate with a source of liquid lubricant and a metering device (not shown) for directing the lubricant onto the bristles 204 of the brushes 200 at periodic intervals for subsequent application to the bead seats 172. The metering device may take the form of a plunger which draws the lubricant into a chamber on the intake stroke of a piston in the cylinder and then expels a metered amount of the lubricant onto the brushes through the nozzles 206 on the exhaust stroke.

A pair of vertical rollers 208 are supported by the legs 198 on laterally opposite sides of the brushes 200 presenting a radially inner rolling contact surface 210 which engages the upper bead seat 172 of the wheels W during application of the lubricant. The contact surfaces 210 of the rollers 208 are positioned radially outwardly of the working axis A by a distance slightly greater than the radial spacing of the bristles 204, such that when the rollers 208 are in contact with the wheels W the bristles 204 extend somewhat beyond the rims, as illustrated in FIG. 9, assuring full positive contact of the bristles 204 with the rims without causing undue wear of the bristles 204. In practice, the rollers 208 can be arranged to provide about one half inch of bristle extending radially beyond the rollers, although more or less bristle exposure can be achieved by adjusting the position of the rollers 208.

Each brush carriage 192 has associated therewith a linear actuator in the preferred form of an air cylinder 212 to control positioning of the carriages 192 and their brushes 200 along the guide rails 190. The actuators 212 comprise a fluid cylinder 214 fixed at a radially outer end to mounting brackets 216 extending off the free ends of the arms 184 and 186. Rods 218 extend from the opposite end of the cylinders 214 and are coupled by an adjustable fitting 220 via dowel pin 222 to an upstanding mounting projection 224 of each carriage 192, such that extending the rods 218 produces a corresponding radially inward movement of the carriages 192 and brushes 200, and retracting the rods 218 produces a corresponding radially outward movement of the brushes 200. The actuators 212 are synchronized for conjoint actuation and hence control the movement of the brushes 200.

Figure 8:
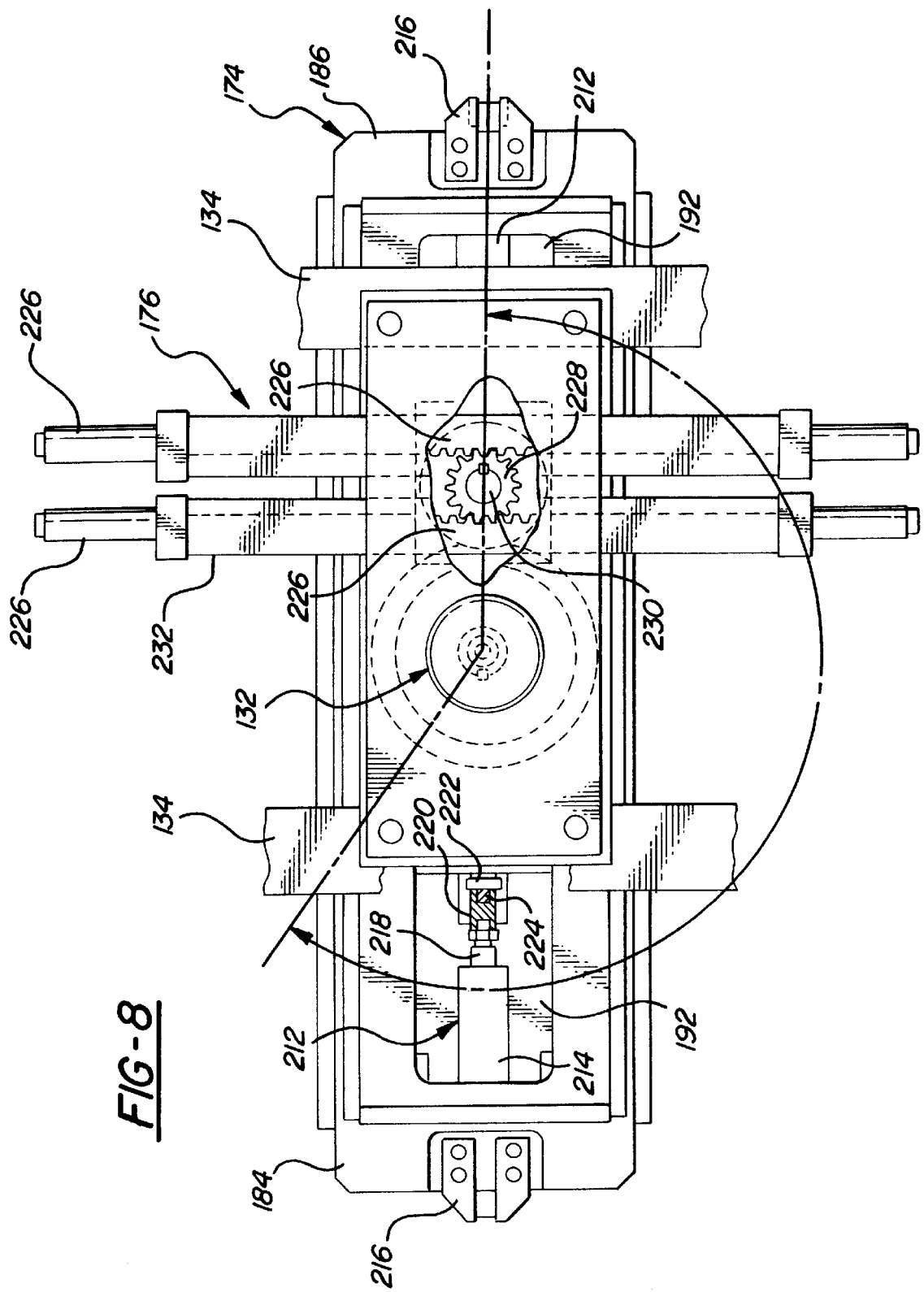
FIG. 8 is a fragmentary plan view, shown partly broken away, and illustrating features of the drive system of the rotary applicator.

The rotary actuator 176 is also shown best in FIGS. 8 and 9 and comprises a pair of toothed drive racks 226 enmeshed with a pinion gear 228 keyed to the upper end of a vertical shaft 230 and supported slidably by air-powered actuator cylinders 232 to impart equal but opposite linear motion to the racks 226 which in turn drives the pinion gear in its shaft 230 in one direction or the other. The cylinders 232 are fixed to the overhead support frame 134. Spur gear 234 is fixed to the lower end of shaft 230 and enmeshed with driven gear 236 fixed about the hub 178 of rotary carriage 174. The rack and pinion drive allows for precise, controlled movement of the rotary carriage 174. By controlling the stroke of the racks 226, corresponding control is provided over movement of the carriage 174. In the preferred arrangement, the stroke of the racks 226 are controlled such that during a given soaping cycle, the carriage 174 and hence the brushes 200 are caused to rotate at least 180° and preferably about 190° along an arcuate coverage path P to assure complete coverage of the wheel W with an small amount of overlap. In the next subsequent soaping cycle, the stroke of the racks 226 is reversed to again move the brushes 200 in the opposite direction along the coverage path to lubricate the next wheel. The process continues for subsequent soaping cycles. It will be appreciated that the use of two brushes 200 lessens the movement and hence the cycle time to lubricate a wheel as compared to the soaping cycle if one brush were used.

THE OPERATION

It will be understood that actuation of the various moving components of the apparatus 10 may be controlled by any of several commercially available programmable controllers in a manner well known to those skilled in the art, with the preferred operating cycle being described below. At the commencement of the cycle, the stop pins 80 are lifted to their elevated wheel-engaging position in FIG. 4, the lower unit 108 is lowered below the level L of the main conveyor 18, the brushes 200 are moved outwardly to a wheel-receiving position on opposite lateral sides of the conveyor 18, and the swing arms 42, 44 are positioned in the wheel-stopping position shown in broken chain lines in FIG. 2.

The controller actuates the rollers 20 of the incoming section 16 to advance the first wheel into position between the swing arms 42, 44. The presence of the wheel is detected by a sensor in the preferred form of a photoswitch 238, whereupon the controller actuates air cylinder 68 to swing the arms 42, 44 to the solid-line wheel releasing position, allowing the first wheel to advance onto the main conveying section 18. At this point, the inward disposition of the first legs 52 of the arms 42, 44 prevent the next subsequent wheel from advancing into position between the arms 42, 44. When the first wheel clears the photo switch 238, the controller moves the arms 42, 44 back to the wheel-stopping position to allow the subsequent wheel to enter into holding position between the arms 42, 44.

Arrival of the first wheel into contact with the stop pins 80 is detected by a suitable sensor in the preferred form of another photo switch 240 or the like, which signals the programmable controller to activate actuator 120 of the wheel support assembly 106 which raises the cone 112 through the central hub opening of the wheel W and causes the pressing plate 114 to engage the central disk 168 of the wheel about the opening 78. The tapered nose of the cone 112 and the closeness of fit of the base 130 of the cone 112 with that of the central hub opening 78 assures that the wheel W is aligned coaxially with the lower unit 108. Continued upper movement of the lower unit 110 raises the wheel W off the conveyor 18 and lifts the wheel W into engagement with the stationary upper unit 110, as illustrated in FIG. 6. Extension of the alignment pin 162 into the bore 160 of bushing 156 assures that the lower unit 108 and thus the wheel W is aligned coaxially with the upper unit 110 and thus the vertical working axis A. When so positioned the wheel W is clamped against rotation between the pressing plate 114 of the lower unit 108 and the pressing ring 164 of the upper unit 110 and is held in this position during soaping of the wheel.

Once the wheel is clamped, the controller energizes actuators 212 to move the brush carriages 192 radially inwardly to the point where the contact surface 210 of the rollers 208 engage the upper rim of the wheel W, as illustrated in FIG. 9. Proximity switches 242 may be provided along the support legs 198 to sense the position of the brush carriages 192. Prior to the initial cycle, sufficient lubricant is provided to the bristles 204 and thereafter the lubricant is reapplied via nozzles 206 under the control of the programmable controller about every third cycle.

When the brushes 200 are moved into position against the bead seats 172 of the wheel W, the programmable controller actuates cylinders 232 to displace the racks 226 in equal but opposite directions along a predetermined stroke length which, through gears 228, 234 and 236, cause the rotary carriage 174 and hence the brushes 200 to revolve around the working axis A along the prescribed coverage path P which, as mentioned, is sufficient to cover the entire perimeter of the bead seats 172 with lubricant from the bristles 204 and preferably with a small amount of overlap at the end of the stroke.

The controller again energizes actuator 212 to drive the brush carriages 192 and hence the brushes 200 radially out of engagement with the bead seats 172 of the wheel W back to the ready position, whereupon the wheel W is lowered by the retraction of lower unit 108 and advanced by the belts 26 of the conveyor 18 past the stop pins 80 which in the interim were lowered, onto the next station (not shown).

As the first wheel passes the photo switch 240, it signals the controller to swing the arms 242, 244 open to release the next wheel and to elevate the stop pins 80. The lubrication of this wheel is carried out in the same manner except that the stroke of the racks and thus the rotation of the rotary carriage 174 and brushes 200 is in the opposite direction as the previous cycle, but is otherwise the same.

The disclosed embodiment is representative of a presently preferred form of the invention, but is intended to be illustrative rather than definitive thereof. The invention is defined in the claims.

I claim:

1. Apparatus for lubricating the bead seats of a wheel dismounted from a tire to condition the wheel for mounting a tire thereon, comprising:

a base;

a wheel support assembly mounted on said base and engageable with a wheel dismounted from a tire for supporting the wheel against rotation about an axis of the support assembly, said support assembly being movable relative to the base; and an applicator assembly supported for rotation about said axis to apply a lubricant to the bead seats of the wheel.

2. Apparatus of claim 1 wherein said applicator assembly includes a rotary carriage and at least one lubricant-applying applicator mounted on said carriage in radially outwardly spaced relation to said axis.

3. Apparatus of claim 2 including a spindle supported along said axis and journaling said carriage and said applicator for conjoint rotation about said axis.

4. Apparatus of claim 3 including a rotary drive coupled to said carriage for imparting said rotation to said carriage.

5. Apparatus of claim 4 wherein there are two of said applicators mounted on said carriage in opposed relation to one another and said rotary drive includes a control system for rotating said applicators along at least 180 degree coverage path to provide complete coverage of the bead seats with lubricant composition.

6. Apparatus of claim 5 wherein said coverage path is about 190 degrees.

7. Apparatus of claim 5 wherein said control system alternates the direction of rotation of said applicators along said coverage path between successive lubricating cycles.

8. Apparatus of claim 2 wherein said at least one applicator is adjustable on said carriage radially of said axis.

9. Apparatus of claim 8 wherein the are two of said applicators arranged in opposed relation to one another on said carriage.

10. Apparatus of claim 9 wherein said applicators comprise brushes.

11. Apparatus of claim 3 wherein said wheel support assembly includes an upper wheel-engaging clamp member secured to a lower free end of said spindle along said axis.

12. Apparatus of claim 11 wherein said wheel fixture includes a lower wheel-engaging clamp member mounted below said upper clamp member on a linear actuator enabling movement of said lower clamp member along said axis toward and away from said upper clamp member for clamping and releasing the wheel, respectively.

13. Wheel lubricating apparatus for applying a lubricant to the bead seats of wheels to facilitate the mounting of tires upon the wheels, said apparatus comprising:

a frame;

a wheel fixture for supporting a wheel to be lubricated against rotation about an axis of the fixture, said fixture including a stationary spindle mounted on said frame along said axis, an upper wheel-engaging clamping member mounted on a lower free end of said spindle, a lower clamping member disposed along said axis below said upper clamping member, and a lift device mounted on said frame and supporting said lower clamping member for movement along said axis toward and away from said upper clamping member for clamping and releasing the wheel, respectively; and an applicator assembly rotatable relative to said wheel fixture about said axis for applying lubricant to the bead seats of the wheel, said applicator assembly comprising a rotary carriage journaled by said spindle for rotation about said axis, a pair of applicator brushes mounted on said carriage in opposed relation to one another for rotation with said carriage about said axis to engage and apply a lubricant to the bead seats, said brushes being adjustable radially of said axis, and a rotary drive coupled to said carriage for imparting rotation to said carriage.

14. Apparatus of claim 13 wherein said rotary drive alternates the direction of rotation of said carriage between successive lubricating cycles.

15. Apparatus of claim 14 wherein said rotary drive moves said carriage through about a 180 to 190 degree arc during each lubricating cycle.

16. Apparatus of claim 13 wherein said rotary drive includes a drive rack mounted for reciprocable sliding movement on said frame and geared to said carriage for imparting alternating rotational movement to said carriage in response to reciprocating sliding movement of said drive rack.

17. Apparatus for lubricating the bead seats of a wheel to condition the wheel for mounting a tire thereon, comprising:
   a base;
   a wheel support assembly mounted on said base for supporting a wheel to be lubricated against rotation about an axis of the support assembly; and
   an applicator assembly supported for rotation about said axis to apply a lubricant to the bead seats of the wheel, said applicator assembly including a rotary carriage and a pair of lubricant-applying applicators mounted on said carriage in opposed radially outwardly spaced relation to said axis and wherein at least one of said applicators is adjustable on said carriage radially of said axis.

* * * * *